Nov. 26, 1968      W. CULL      3,412,580

UNIVERSAL JOINTS

Filed May 4, 1966

INVENTOR
WILLIAM CULL
BY
Young & Thompson

ATTORNEYS

United States Patent Office 3,412,580
Patented Nov. 26, 1968

3,412,580
UNIVERSAL JOINTS
William Cull, Hest Bank, near Lancaster, England, assignor to Birfield Engineering Limited, London, England
Filed May 4, 1966, Ser. No. 547,657
Claims priority, application Great Britain, May 26, 1965, 22,350/65
5 Claims. (Cl. 64—21)

ABSTRACT OF THE DISCLOSURE

A constant velocity universal joint comprising inner and outer joint members formed with ball tracks to accommodate torque-transmitting balls which engage and move along corresponding tracks which are arranged to converge. A one-piece solid annular ball cage between said members is asymmetrical about the plane in which the ball centres lie, and is stronger on the side to which the balls are urged by track convergence so as to be better able to withstand the ball reaction.

---

Figure 1:
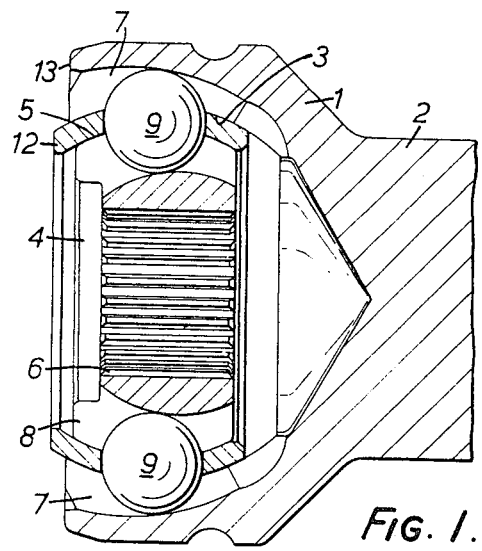

This invention relates to universal joints of the constant velocity type, in which relative articulation of inner and outer joint members is accommodated by torque-transmitting balls which engage and move along corresponding grooves forming ball tracks in the joint members. To achieve constant velocity characteristics it is essential that the balls should be guided so that the ball centres lie in the instantaneous median plane of the joint which bisects the angle between the input and output axes, i.e. the rotational axes of the inner and outer members.

The invention is concerned with joints of the foregoing character in which ball guiding is achieved by means of an annular cage with spaced windows in which the balls are housed and a convergence of the ball tracks which acts, in effect, to "squeeze out" the balls so that they are all urged to one side of the joint. The reaction to the forces urging the balls in this direction is provided by engagement of the balls with the corresponding side of the cage windows, the cage having an inner part-spherical surface which is a fit on the outer surface of the inner member to hold the cage captive on the latter.

According to the invention such a joint has a one-piece solid cage which is asymmetrical about the plane in which the ball centres lie, in such manner that the cage is stronger on the side to which the balls are urged by track convergence and hence is better able to withstand the ball reaction.

During assembly of the joint it is necessary for the cage to be fitted on to the inner member; to achieve this it is normally necessary for two diametrically opposed windows to be larger than necessary for ball guiding purposes, being extended in the circumferential direction so that they are each large enough to fit over the lands between the ball tracks of the inner member. Thus normally the cage has two relatively large windows for assembly purposes with the remainder considerably smaller, and the cage is naturally weakest in the regions of the larger windows at the side to which the balls are urged by track convergence. The asymmetry of the invention may result from strengthening the edge of the cage in those regions only, for example, by "rounding off" the corresponding side edges of the larger windows so that there is an increase in axial thickness of the side edge of the cage from the centre towards the circumferential ends of the larger windows. In the usual form of cage the larger windows are of generally rectangular shape in developed view with the corners merely radiused off to a small radius. Some rounding off of the smaller cage windows may also be found desirable although the main disadvantage of prior constructions which it is an object of the invention to overcome is, as mentioned, relative weakness at one side of the larger windows.

Preferably the side edges of the larger windows towards which the balls are urged by track convergence are shaped to an even stress curve, so that during joint operation the bending stress at that side of the larger windows is substantially constant throughout the circumferential length of those windows. The section of the cage at the side of the window can, generally speaking, be considered as a beam supported at both ends, and when such a beam is loaded in the middle the curve of uniform stress takes the form of a parabola in accordance with the formula $$S = WL/4Z$$

where
$S$ = Stress
$W$ = Load
$L$ = Length of beam
$Z$ = Section modulus of beam Thus it is preferred that the ball-engaged side edge of each larger window should generally follow such a curve.

The asymmetry of the invention may additionally, or alternatively, result from the cage being wider in the axial direction on one side of the cage windows than on the other; this is allowable if the limitation that assembly of the joint can only be achieved from one side can be entertained, i.e. the cage can only be fitted on the inner member from one side of the latter. Forming the cage wider at one side in this manner acts to increase the beam strength at that side of each cage window.

Figure 2:
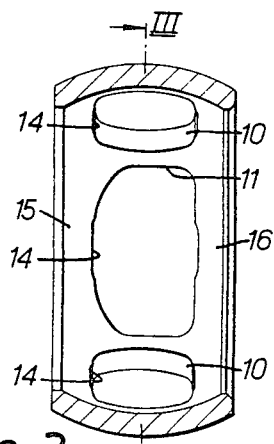
Figure 3:
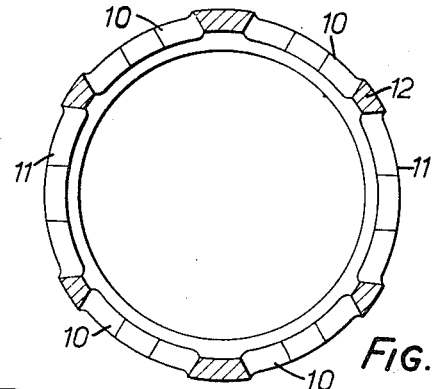
Figure 4:
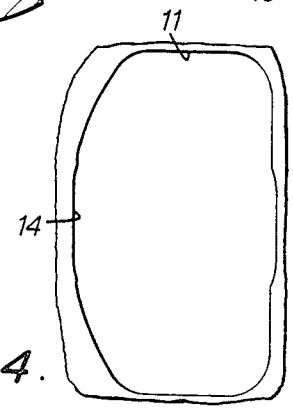
Figure 5:
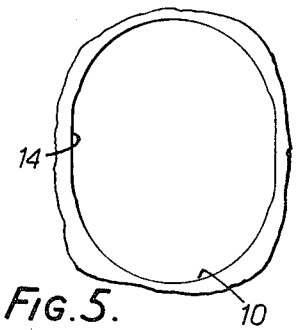

A constant velocity universal joint representing an illustrative embodiment of the invention will now be described by way of example with reference to the accompanying drawings, in which:

FIGURE 1 is an axial cross section of the joint,
FIGURE 2 is an axial cross section of the ball cage of the joint,
FIGURE 3 is a section on the line III—III of FIGURE 2, and
FIGURES 4 and 5 are details to a larger scale of FIGURE 2.

The joint has a bell-shaped outer member 1 with an integral projecting shaft portion 2 and an inner part-spherical surface 3. An inner joint member 4 has a concentric part-spherical outer surface 5 and is in the form of a truncated sphere with a splined central bore 6 for reception of the inner end of a separate shaft (not shown).

The inner surface 3 of the outer member 1 and the outer surface 5 of the inner member 4 are machined with a series of corresponding ball tracks 7 and 8, respectively, torque-transmitting balls 9 respectively engaging corresponding pairs of tracks in the two members and moving therealong during joint articulation. The balls 9 are housed in windows 10 and 11 formed in the wall of a cage 12 which has part-spherical inner and outer surfaces is a sliding fit between the inner and outer members 4 and 1. The cage 12 thus not only assists in ball guiding, so that the balls 9 are accurately located in the median plane of the joint, but also serves to centre the inner member 4 within the outer member 1. The ball tracks 7 and 8 are arranged to converge in known manner so that during joint operation the balls 9 are all constantly urged towards the open end 13 of the outer joint member 1, and the forces urging the balls in this direction are withstood by engagement of the balls with the corresponding side edges 14 of the cage windows 10 and 11. This imposes a bending stress on the outer side edge 15 of the cage 12, reaction to the stress being taken in the form of a hoop stress resulting from engagement of the other or inner side edge 16 of the cage with the outer surface 5 of the inner member 4.

In order to increase the strength of the cage 12 at the outer side of the latter, so that it is better able to withstand the ball reaction, the outer side edge 15 is wider in the axial sense than the inner side edge 16. This also serves to increase the area of sliding contact of the cage 12 with the outer and inner members 1 and 4. As usual, for assembly purposes two diametrically opposed cage windows 11 are larger than the remainder, being additionally elongated in the circumferential direction so that one of the lands between adjacent ball tracks 8 in the inner member 4 can pass through one of the larger windows during assembly. The cage 12 is thus inherently weakest in regions at the outer side edge portions of the larger windows 11, and to increase the strength in these regions the outer side edges 14 of these two windows are formed to an even stress curve. As a result, reaction with the corresponding ball 9 at either of these side edges 14 results in a substantially even distribution of bending stress in the corresponding edge region of the cage 12.

The corners of the smaller windows 10 are, for strengthening purposes, also rounded off somewhat at least at the outer side of the cage, as compared with prior constructions. In such constructions the corners of the rectangular windows are merely radiused to a suitable small curvature.

The described construction has an advantage from the manufacturing standpoint, namely that the modified cage window shape provides a significant decrease in area of shear for punching and broaching tools. This results in an increased tool life and correspondingly reduced production costs.

The main advantages from the standpoint of joint operation can be summed up briefly under three headings. Firstly, increased resistance of the joint to shock loads due to increased beam strength and bursting strength of the cage 12; secondly, increased torque capacity at high joint angles due to increased rigidity of the cage 12; and thirdly, reduced rate of wear due to the increased surface area of the cage 12 in sliding contact with inner and outer joint members 4 and 1.

I claim:

1. A constant velocity universal joint comprising inner and outer joint members formed with ball tracks to accommodate torque-transmitting balls which engage and move along corresponding tracks whose ball contacting surfaces converge, and a rigid one-piece solid annular ball cage which is asymmetrical about the plane in which the ball centers lie, the cage being formed with windows in which said balls are respectively received and being stronger on the side to which the balls are urged by convergence of said ball contacting surfaces and hence is better able to withstand the ball reaction.

2. A universal joint according to claim 1, wherein the cage is made wider in the axial direction on one side of the cage windows than on the other, this side being the one to which the balls are urged by convergence of said ball contacting surfaces.

3. A universal joint according to claim 1, wherein the cage is formed with two diametrically opposed windows which are larger than the other of said windows formed therein, the side edges of the larger windows in the regions at the side to which the balls are urged by track bottom convergence being rounded off so that there is an increase in axial width of the side edge of the cage from the centre towards the circumferential ends of the larger windows.

4. A universal joint according to claim 3 wherein said side edges of the larger windows are shaped to an even stress curve so that during joint operation the stress at that side of the larger windows is substantially constant throughout the circumferential length of those windows.

5. A universal joint according to claim 3, wherein the side edges of all the windows in the cage are rounded off in the regions at the side to which the balls are urged by track convergence.

References Cited
UNITED STATES PATENTS

| | | | |
|---|---|---|---|
| 3,218,827 | 11/1965 | Aucktor | 64—8 |
| 1,916,442 | 7/1933 | Rzeppa | 64—21 |
| 1,975,758 | 10/1934 | Stuber | 64—21 |
| 3,298,201 | 1/1967 | Cadiou | 64—21 |
| 3,324,682 | 6/1967 | Bendler | 64—21 |

HALL C. COE, *Primary Examiner.*